(12) United States Patent
Nulph

(10) Patent No.: US 12,203,587 B1
(45) Date of Patent: Jan. 21, 2025

(54) WHEEL LINE TRANSMISSION PIPE SYSTEM

(71) Applicant: Raymond Nulph, American Falls, ID (US)

(72) Inventor: Raymond Nulph, American Falls, ID (US)

( * ) Notice: Subject to any disclaimer, the term of this patent is extended or adjusted under 35 U.S.C. 154(b) by 0 days.

(21) Appl. No.: 18/895,592

(22) Filed: Sep. 25, 2024

(51) Int. Cl.
*F16L 9/22* (2006.01)
*F16L 21/03* (2006.01)
*A01G 25/09* (2006.01)

(52) U.S. Cl.
CPC .............. *F16L 9/22* (2013.01); *F16L 21/03* (2013.01); *A01G 25/09* (2013.01)

(58) Field of Classification Search
CPC ......... F16L 27/00; F16L 27/04; F16L 27/053; F16L 27/08; F16L 27/0804; F16L 27/0808; F16L 9/22; F16L 17/00; F16L 17/02; F16L 17/06; F16L 17/063; F16L 21/002; F16L 21/02; F16L 21/022; F16L 25/10; F16L 25/12
See application file for complete search history.

(56) References Cited

U.S. PATENT DOCUMENTS

| 10,774,966 B2 * | 9/2020 | Mathers | ................ F16L 27/053 |
| 2020/0080671 A1 * | 3/2020 | Atkinson | .............. F16L 21/002 |

* cited by examiner

*Primary Examiner* — Aaron M Dunwoody

(57) ABSTRACT

A wheel line transmission pipe system includes a first, female tube section, a second, female tube section, and a male tube section that is interposed between the first tube section and the second tube section. The first, female tube section includes a first channel that is recessed on an internal surface of the first tube section and receives a first gasket therein. The second tube section includes a second channel that is recessed on an internal surface of the second tube section and receives a second gasket therein. The male tube section, once coupled to the first tube section and the second tube section, may receive a transmission.

17 Claims, 9 Drawing Sheets

WHEEL LINE TRANSMISSION PIPE SYSTEM

CROSS-REFERENCE TO RELATED APPLICATIONS

Not applicable.

TECHNICAL FIELD

The present disclosure relates to an irrigation system. More particularly, the present disclosure relates to an irrigation system for a wheel line that prevents leaks.

BACKGROUND

Irrigation of crops has been an essential part of human history for thousands and thousands of years. For many years humanity carried water in totes or buckets from rivers, lakes, etc. to put on crops. As humanity progressed, many diverted waterways to provide moisture to crops by preparing ditches or canals to divert water to particular sections of land for flood irrigation. The world's first sprinkler did not make its appearance until the early 1800s and many sprinkler systems are still used today to provide water to crops. One of these relatively new irrigation sprinkler systems came into existence in the $20^{th}$ century and had the capability of moving. These wheel line irrigation systems have been extremely important for increasing crop production and in aiding farmers in easily watering their crops.

While these wheel line irrigation systems have been an important invention and advancement in irrigation and crop production, there are still many shortcomings with these systems. As an example of one of these inherent shortcomings, current wheel line systems often have issues with leaking water throughout the wheel line but often around the transmission coupling section. Due to the arid environments of many irrigated crops, loss of any water is detrimental. Not only is the loss of water an issue in many environments, but leaking water may affect crops by deterring appropriate amounts of water to other non-leaking portions of the irrigation system, thereby creating weak crops. Furthermore, the soil underneath these leaks becomes over saturated, destroying crops and creating muddy, messy sections of soil.

Accordingly, there is a need for a system that seals properly and prevents loss of water. The present invention seeks to solve these and other problems.

SUMMARY OF EXAMPLE EMBODIMENTS

In one embodiment, a wheel line transmission pipe system comprises a first, female tube section, a second, female tube section, and a male tube section that is interposed between the first tube section and the second tube section. The first tube section may include a first end and a second end. The first end may have a first tube aperture that is configured to receive a first section of sprinkler pipe. The second end may include a first plate that is coupled thereto. A first tube aperture may be positioned on the first plate so as to allow access to an internal compartment of the first tube section. The first plate may be configured to receive/mate with a portion of a transmission. A first side of the first tube section may include a first bracket that couples thereto via one or more bracket fasteners. A second side of the first tube section may include a second bracket that couples thereto via one or more bracket fasteners. Proximate the second end may be a first raised section of the first tube section that wraps around or follows the circumference of the first tube section, thereby creating a first channel that is recessed on an internal surface of the first tube section. This first channel may be configured to receive a first gasket.

The second tube section may include a third end and a fourth end. The third end may have a third tube aperture that is configured to receive a second section of sprinkler pipe. The fourth end may include a second plate that is coupled thereto. A fourth tube aperture may be positioned on the second plate so as to allow access to an internal compartment of the second tube section. The second plate may be configured to receive/mate with a portion of a transmission. A third side of the second tube section may include a third bracket that couples thereto via one or more bracket fasteners. A fourth side of the second tube section may include a fourth bracket that couples thereto via one or more bracket fasteners. Proximate the fourth end may be a second raised section of the second tube section that wraps around or follows the circumference of the second tube section, thereby creating a second channel that is recessed on an internal surface of the second tube section. This second channel may be configured to receive a second gasket.

The male tube section, once coupled to the first tube section and the second tube section, may receive a transmission. The male tube section may have a first male end and a second male end. The first male end may be placed in the second tube aperture or the fourth tube aperture. The second male end may be placed in the second tube aperture or the fourth tube aperture.

DETAILED DESCRIPTION OF EXAMPLE EMBODIMENTS

Figure 1:
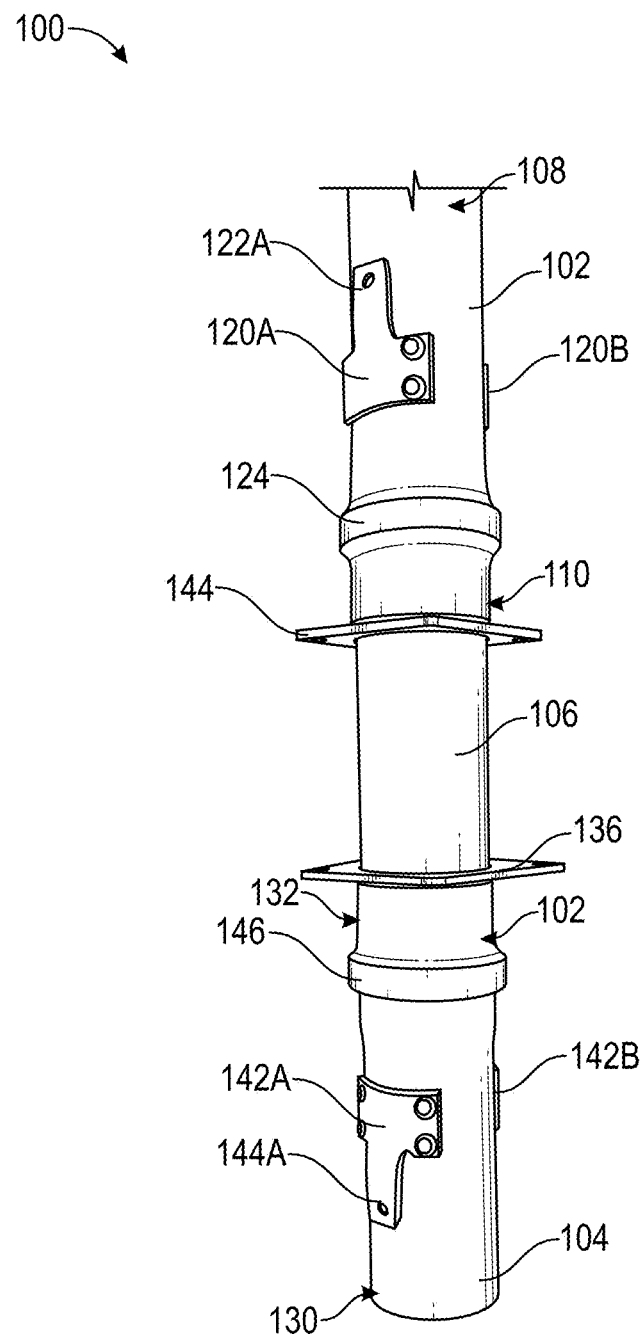
FIG. 1 illustrates a side perspective view of a wheel line transmission pipe system.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

It will be understood that the detailed description depicts only example embodiments, which are not to be considered limiting in scope. Reference to the invention, the present disclosure, or the like are not intended to restrict or limit the invention, the present disclosure, or the like to exact features or steps of any one or more of the exemplary embodiments disclosed herein. References to "one embodiment," "an embodiment," "various embodiments," and the like, may indicate that the embodiment(s) so described may include a particular feature, structure, or characteristic, but not every embodiment necessarily includes the particular feature, structure, or characteristic. In addition, repeated use of the phrase "in one embodiment," or "in an embodiment," do not necessarily refer to the same embodiment, although they may refer to the same embodiment.

The particular arrangements disclosed herein are meant to be illustrative only and not limiting as to the scope of the invention. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described.

It will be understood that the steps of any such processes or methods are not limited to being carried out in any particular sequence or arrangement. In fact, the steps of the disclosed processes or methods generally may be carried out in various different sequences and arrangements while still falling within the scope of the present invention.

The terms "comprising," "including," "having," and the like, as used with respect to embodiments, are synonymous, and are generally intended as "open" terms.

As previously discussed, there is a need for a system that seals properly and prevents loss of water. The present invention seeks to solve these and other problems.

Diverting water to produce crops has been utilized by civilizations for thousands of years. Early stages of diverting water ways often came in the form of buckets and transporting water in that manner. As irrigation techniques evolved, products were developed, such as wheel line irrigation sprinklers, that dramatically changed the ability of farms to evenly, consistently, and regularly apply moisture to crops, thereby creating more crops and better yield from a given crop. However, while there are numerous benefits to these products and systems, there are also many inherent shortcomings in design and function. As an example, the configuration and design of pipes proximate wheel line transmissions often leak, causing loss of adequate pressure in the system to continue consistent watering.

The system described herein is capable of preventing leaks proximate the transmission, which allows a user to save money and time. The system comprises a first tube section, a second tube section, and a male section that is positioned between and coupled to the first tube section and the second tube section. The system further includes critically positioned gaskets in the first tube section and the second tube section that seal around the circumference of the male tube section. It will be appreciated that this system is easy to use, install, and prevents leaks unlike other wheel line systems known in the art.

Figure 2:
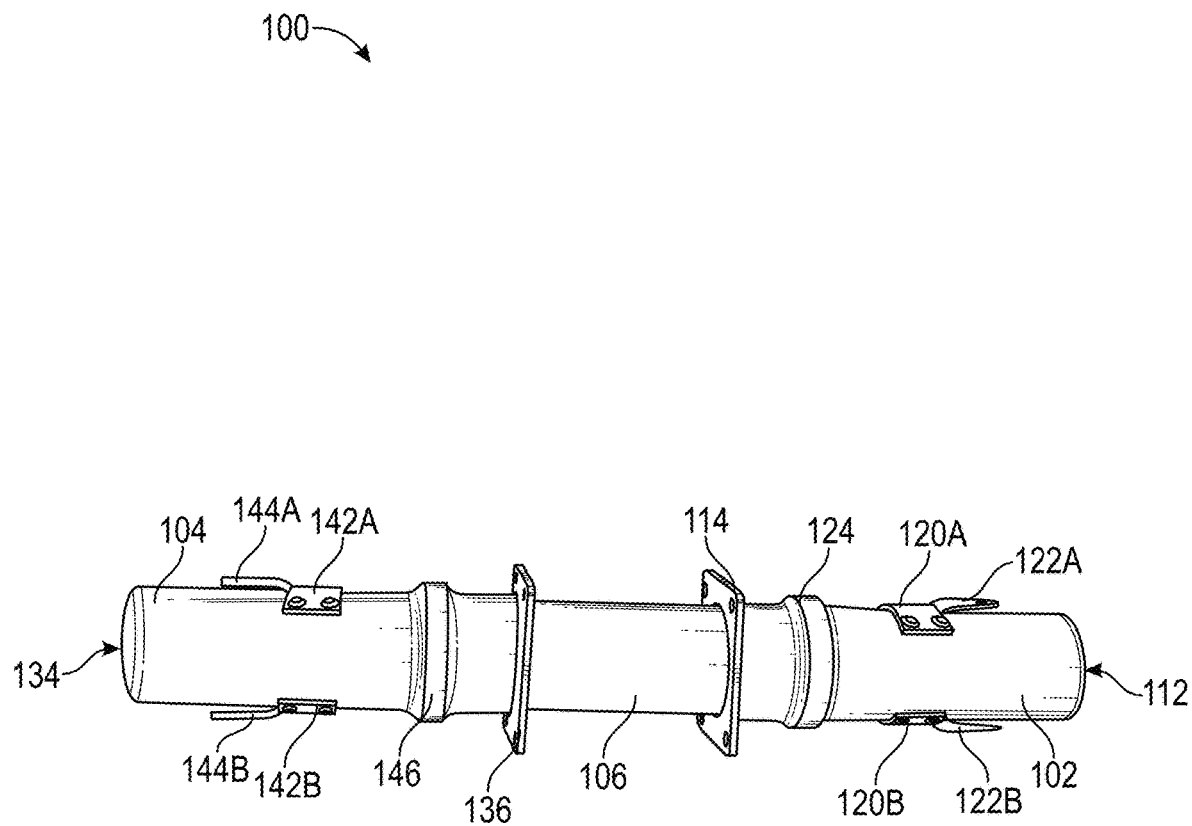
FIG. 2 illustrates a side perspective view of a wheel line transmission pipe system.
Figure 3:
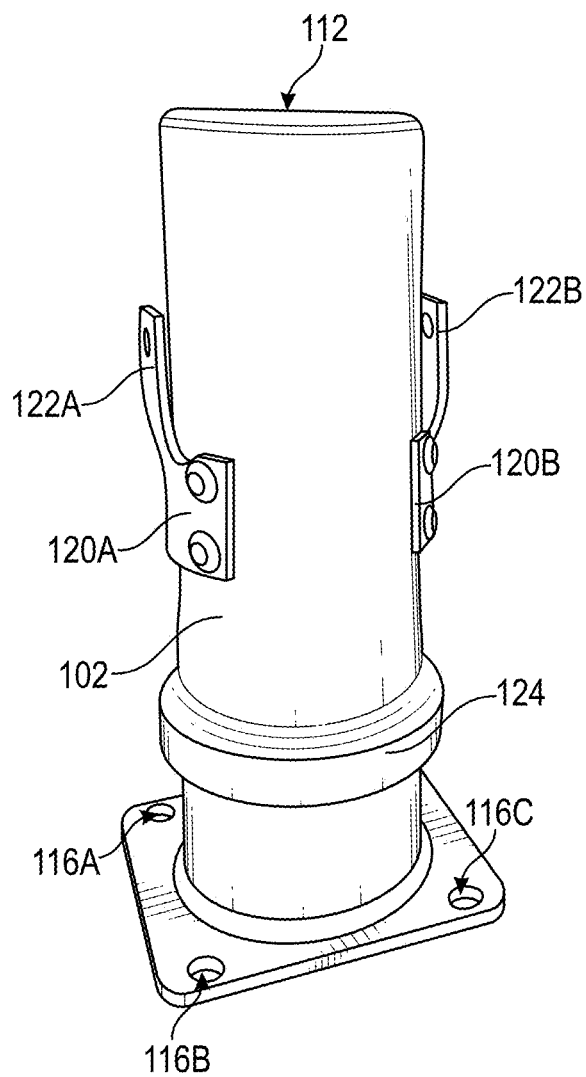
FIG. 3 illustrates a perspective view of a first tube section of a wheel line transmission pipe system.
Figure 4:
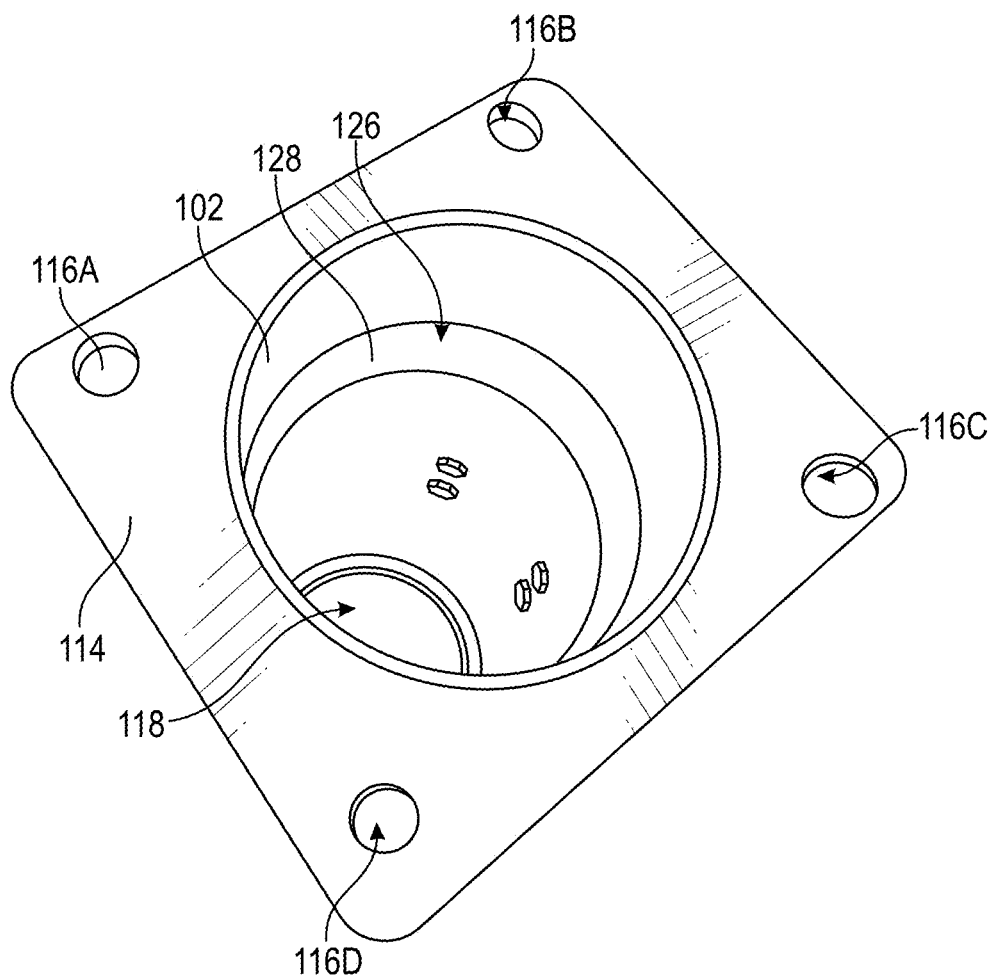
FIG. 4 illustrates a front perspective view of a first tube section of a wheel line transmission pipe system.
Figure 5:
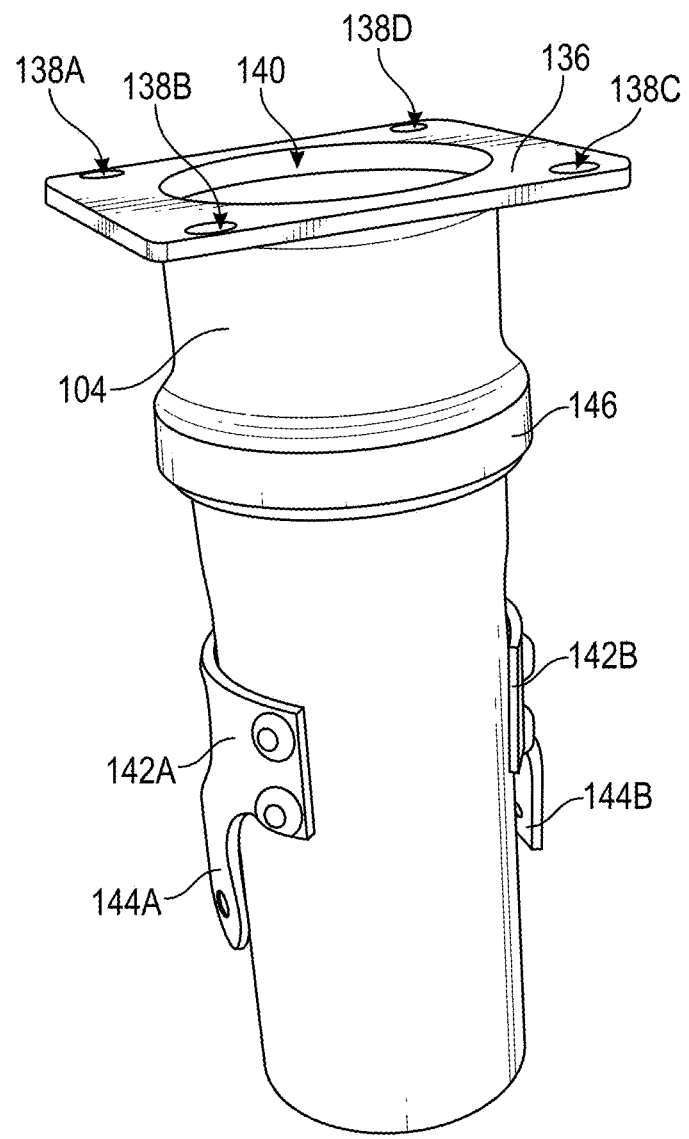
FIG. 5 illustrates a perspective view of a second tube section of a wheel line transmission pipe system.
Figure 6:
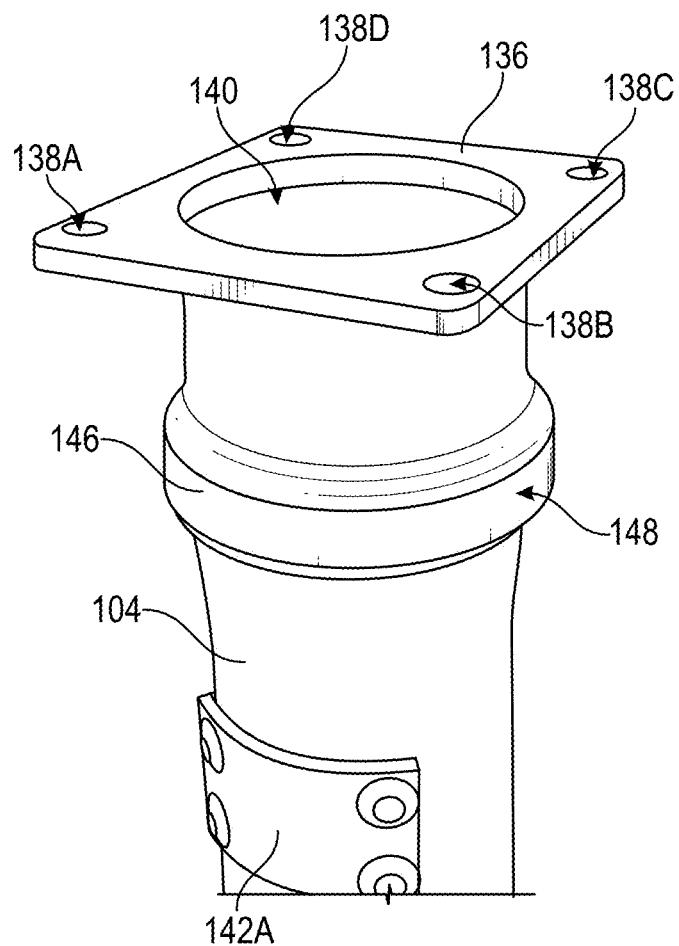
FIG. 6 illustrates a perspective view of a second tube section of a wheel line transmission pipe system.

As shown in FIG. 1-2, in one embodiment, a wheel line transmission pipe system 100 (hereinafter referred to herein as the "system") comprises a first, female tube section 102, a second, female tube section 104, and a male tube section 106 that is interposed between the first tube section 102 and the second tube section 104. The system 100 may be manufactured from aluminum. Other embodiments may include a system manufactured from steel, plastic, etc. The sections 102-106 of the system 100 may be cylindrical. It will be appreciated that in other embodiments other shapes may be considered.

As shown in FIGS. 1-4, the first tube section 102 may include a first end 108 and a second end 110. The first end 108 may have a first tube aperture 112 that is configured to receive a first section of sprinkler pipe. The second end 110 may include a first plate 114 that is coupled thereto. The first plate 114 may include a first plate aperture 116A, a second plate aperture 116B, a third plate aperture 116C, and a fourth plate aperture 116D. A second tube aperture 118 may be positioned on the first plate 114 so as to allow access to an internal compartment of the first tube section 102. The first plate 114 may be configured to receive/mate with a portion of a transmission. The first plate 114 may couple to the transmission via fasteners (e.g., bolts) that pass through the first plate, second plate, third plate, and fourth plate apertures 116A-116D and receive the transmission. While four plate apertures 116A-116D are discussed, it could be envisioned that more or less than four apertures may be on the first plate 114. A first side of the first tube section 102 may include a first bracket 120A that couples thereto via one or more bracket fasteners. The first bracket 120A may include a first finger 122A that is raised off of an outer surface of the first tube section 102. The first finger 122A may have a first finger aperture to receive a first coupler. A second side of the first tube section 102 may include a second bracket 120B that couples thereto via one or more bracket fasteners. The second bracket 120B may include a second finger 122B that is raised off of an outer surface of the first tube section 102. The second finger 122B may have a second finger aperture to receive a second coupler. The first and second brackets 120A, 120B may be configured to receive additional sections of sprinkler pipe. Proximate the second end 110 may be a first raised section 124 of the first tube section 102 that wraps around or follows the circumference of the first tube section 102, thereby creating a first channel 126 that is recessed on an internal surface of the first tube section 120. This first channel 126 may be configured to receive a first gasket 128. That is, the first gasket 128 may slide into the first channel 126 and remain therein while the male tube 106 is inserted and contacts the first gasket 128. In some embodiments, the gasket 128 may be a western gasket or any other type of gasket.

As shown in FIGS. 1-2, and 5-6, similar to the first tube section 102, the second tube section 104 may include a third end 130 and a fourth end 132. The third end 130 may have a third tube aperture 134 that is configured to receive a second section of sprinkler pipe. The fourth end 132 may include a second plate 136 that is coupled thereto. The second plate 136 may include a fifth plate aperture 138A, a sixth plate aperture 138B, a seventh plate aperture 138C, and an eighth plate aperture 138D. A fourth tube aperture 140 may be positioned on the second plate 136 so as to allow access to an internal compartment of the second tube section 104. The second plate 136 may be configured to receive/mate with a portion of a transmission. The second plate 136 may couple to the transmission via fasteners (e.g., bolts) that pass through the fifth plate, sixth plate, seventh plate, and eighth plate apertures 138A-138D and receive the transmission. While four plate apertures 138A-138D are discussed, it could be envisioned that more or less than four plate apertures may be on the second plate 136. A third side of the second tube section 102 may include a third bracket 142A that couples thereto via one or more bracket fasteners. The third bracket 142A may include a third finger 144A that is raised off of an outer surface of the second tube section 104.

The third finger 144A may have a third finger aperture to receive a third coupler. A fourth side of the second tube section 104 may include a fourth bracket 142B that couples thereto via one or more bracket fasteners. The fourth bracket 142B may include a fourth finger 144B that is raised off of an outer surface of the second tube section 104. The fourth finger 144B may have a fourth finger aperture to receive a fourth coupler. The third and fourth brackets 142A, 142B may be configured to receive additional sections of sprinkler pipe. Proximate the fourth end 132 may be a second raised section 146 of the second tube section 104 that wraps around or follows the circumference of the second tube section 104, thereby creating a second channel 148 that is recessed on an internal surface of the second tube section 104. This second channel 148 may be configured to receive a second gasket (not shown, same as first gasket 128). That is, the second gasket may slide into the second channel 148 and remain therein while the male tube 106 is inserted. In some embodiments, the gasket may be a western gasket or any other type of gasket.

Figure 7:
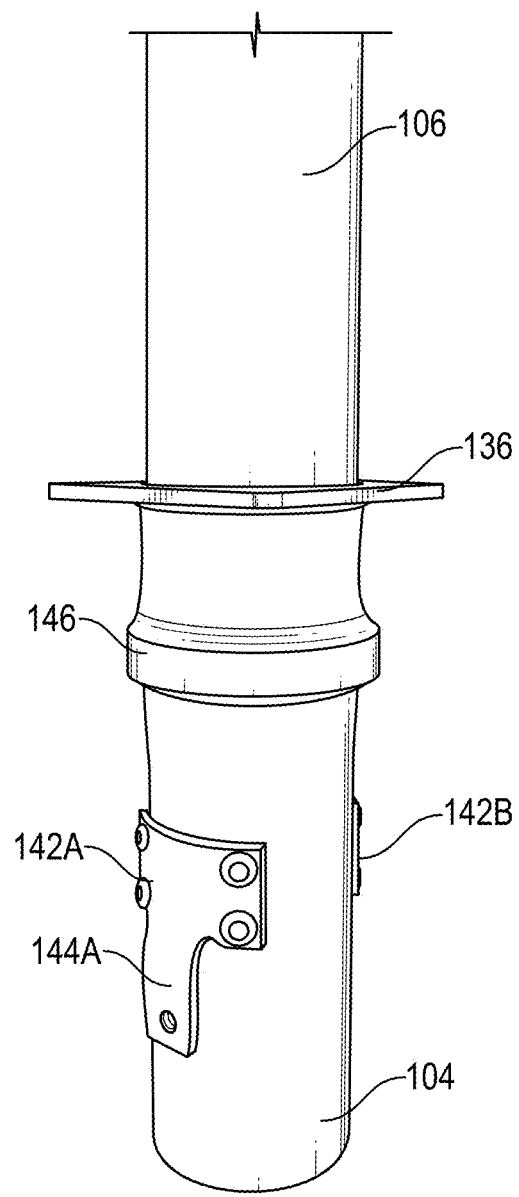
FIG. 7 illustrates a perspective view of a second tube section and a male tube section of a wheel line transmission pipe system.
Figure 8:
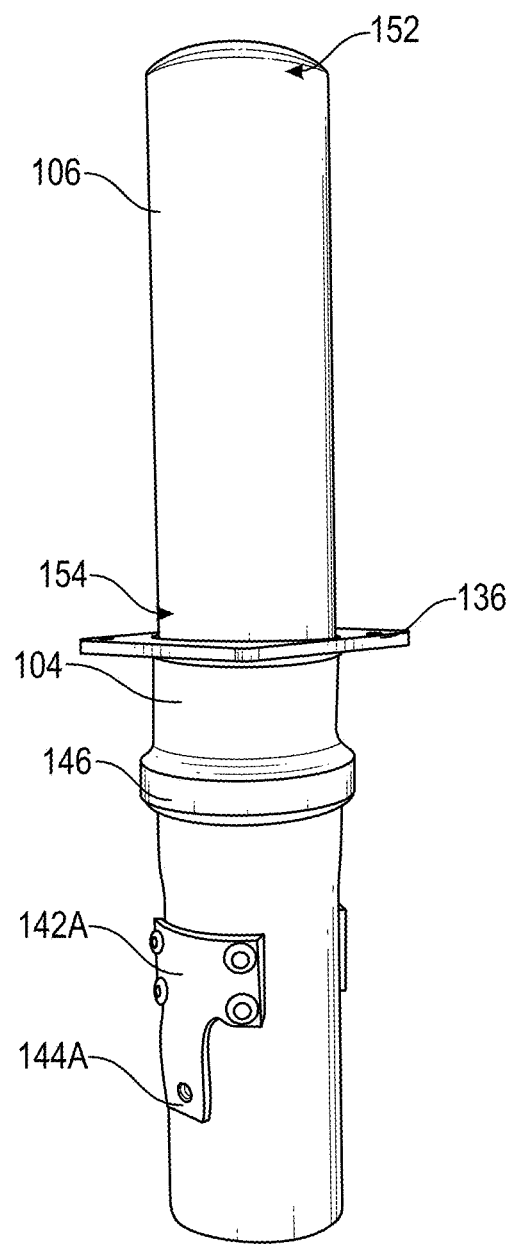
FIG. 8 illustrates a perspective view of a second tube section and a male tube section of a wheel line transmission pipe system.
Figure 9:
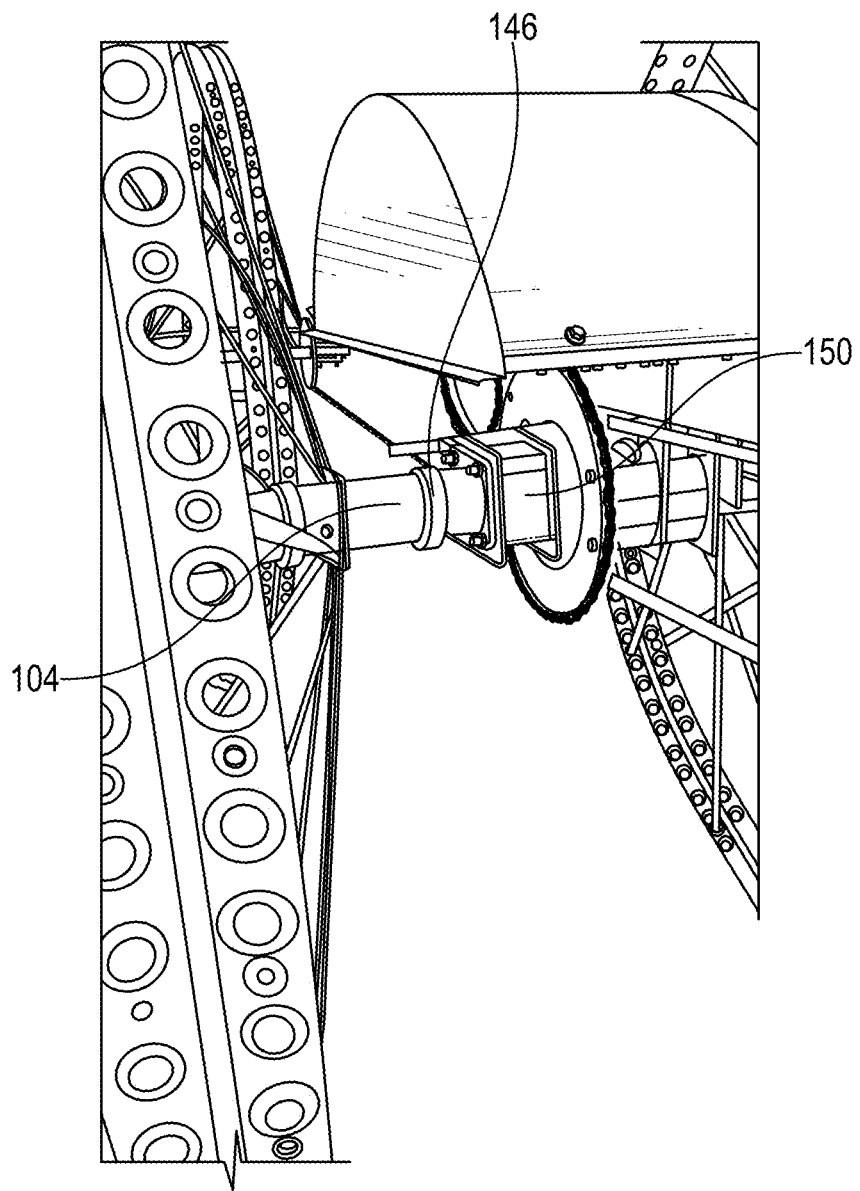
FIG. 9 illustrates a perspective view of a wheel line transmission pipe system.

As shown in FIGS. 7-9, the male tube section 106, once coupled to the first tube section 102 and the second tube section 104, may receive a transmission 150 (FIG. 9). The male tube section 106 may have a first male end 152 and a second male end 154. The first male end 152 may be placed in the second tube aperture 118 or the fourth tube aperture 140. The second male end 154 may be placed in the second tube aperture 118 or the fourth tube aperture 140. Accordingly, in order to couple the male tube section 106 to the first tube section 102 and the second tube section 104, a user may insert the first male end 152 into the second tube aperture 118 on the first tube section 102 or the fourth tube aperture 140 on the second tube section 104, pushing inward until the first male end 152 is secured. On a side opposite the first male end 152, the second male end 154 may be inserted into the second tube aperture 118 on the first tube section 102 or the fourth tube aperture 140 on the second tube section 104 pushing inward until the second male end 154 is secured. As soon as the male tube section 106 is secured into the first and second tube sections 102, 104, a user may couple the transmission 150 to the male tube section 106.

It will be appreciated that the system 100 prevents leaks that often occur around the transmission. These leaks are detrimental to a crop due to loss of water in the sprinkler system. In addition, time and money are also lost due to the fact that leaky pipes will have to be replaced, and it takes time to correct leaks. With the demand of feeding so many in the world, it is essential that precious water, especially in arid regions is put to its best use and dispersed evenly on crops.

It will be understood that while various embodiments have been disclosed herein, other embodiments are contemplated. Further, systems and/or methods according to certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

What is claimed is:

1. A wheel line transmission pipe system comprising:
   a first, female tube section comprising a first end and a second end, with a first raised section proximate the second end, wherein the first raised section wraps around a circumference of the first, female tube section;
   a second, female tube section comprising a third end and a fourth end, with a second raised section proximate the fourth end, wherein the second raised section wraps around a circumference of the second, female tube section;
   a male tube section interposed between and coupleable to the first, female tube section and the second, female tube section;
   a first bracket on a first side of the first, female tube section, and a second bracket on a second side of the first, female tube section; and
   a third bracket on a third side of the second, female tube section, and a fourth bracket on a fourth side of the second, female tube section.

2. The system of claim 1, wherein the first end comprises a first tube aperture that is configured to receive a first section of sprinkler pipe.

3. The system of claim 1, wherein the second end comprises a first plate.

4. The system of claim 3, wherein the first plate comprises one or more plate apertures.

5. The system of claim 3, wherein the first plate circumscribes a second tube aperture at the second end of the first, female tube section.

6. The system of claim 1, wherein the first raised section creates a first channel that is recessed on an internal surface of the first, female tube section.

7. The system of claim 6, wherein the first channel receives a first gasket.

8. The system of claim 1, wherein the third end comprises a third tube aperture that is configured to receive a second section of sprinkler pipe.

9. The system of claim 1, wherein the fourth end comprises a second plate.

10. The system of claim 9, wherein the second plate comprises one or more plate apertures.

11. The system of claim 9, wherein the second plate circumscribes a fourth tube aperture at the fourth end of the second, female tube section.

12. The system of claim 1, wherein the second raised section creates a second channel that is recessed on an internal surface of the second, female tube section.

13. The system of claim 12, wherein the second channel receives a second gasket.

14. A wheel line transmission pipe system comprising:
   a first, female tube section comprising:
      a first end and a second end,
      a first plate coupled to the second end,
      a first raised section proximate the second end, the first raised section comprising a first channel positioned on an inner surface of the first, female tube section, and
      a first gasket positioned in the first channel;
   a second, female tube section comprising:
      a third end and a fourth end,
      a second plate coupled to the fourth end,
      a second raised section proximate the fourth end, the second raised section comprising a second channel positioned on an inner surface of the second, female tube section, and
      a second gasket positioned in the second channel;

a male tube section comprising a first male end and a second male end, wherein either the first male end or the second male end is inserted into the first, female tube section and contacts the first gasket, and either the first male end or the second male end is inserted into the second, female tube section and contacts the second gasket;

a first bracket on a first side of the first, female tube section, and a second bracket on a second side of the first, female tube section;

wherein once the male tube section is coupled to the first, female tube section and the second, female tube section, the male tube section is configured to receive the transmission.

15. The system of claim 14, further comprising a third bracket on a third side of the second, female tube section, and a fourth bracket on a fourth side of the second, female tube section.

16. The system of claim 15, wherein the third bracket comprises a third finger, and the fourth bracket comprises a fourth finger.

17. The system of claim 14, wherein the first bracket comprises a first finger, and the second bracket comprises a second finger.

* * * * *